L. E. STONER.
CHUCK.
APPLICATION FILED MAY 27, 1921.

1,420,780.  Patented June 27, 1922.

INVENTOR
Louis E. Stoner
BY
Harry R. Williams
ATTORNEY

UNITED STATES PATENT OFFICE.

LOUIS E. STONER, OF HARTFORD, CONNECTICUT, ASSIGNOR TO THE JACOBS MANUFACTURING COMPANY, OF HARTFORD, CONNECTICUT, A CORPORATION OF CONNECTICUT.

CHUCK.

1,420,780.  Specification of Letters Patent.  Patented June 27, 1922.

Application filed May 27, 1921. Serial No. 473,119.

*To all whom it may concern:*

Be it known that I, LOUIS E. STONER, a citizen of the United States, residing at Hartford, in the county of Hartford and State of Connecticut, have invented a new and useful Improvement in Chucks, of which the following is a specification.

This invention relates to the construction of the common type of two jaw chucks, which are designed for application to drill presses, lathes and the like machine tools for holding drills and similar implements or stock to be operated upon.

The object of the invention is to provide a construction for chucks of this class which is cheap to manufacture, easy to assemble and very rugged and durable, so that with hard usage it will continue to hold whatever is to be held accurately and firmly.

This object is obtained by the particular construction and arrangement of the feed screw in the body and the manner in which the parts are reenforced.

Figure 1:
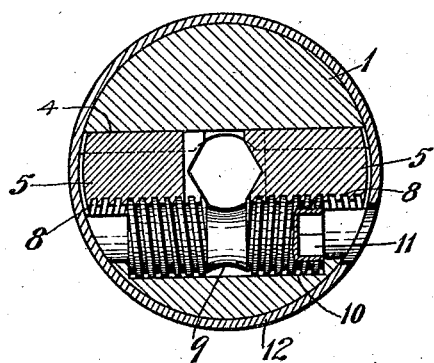
Figure 2:
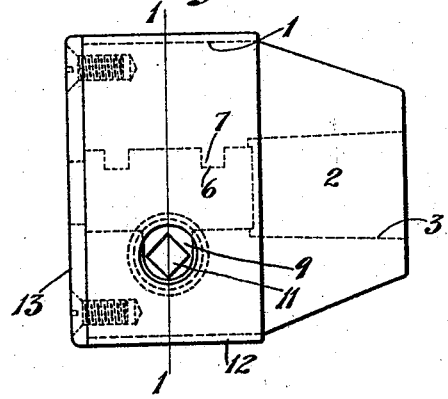
Figure 3:
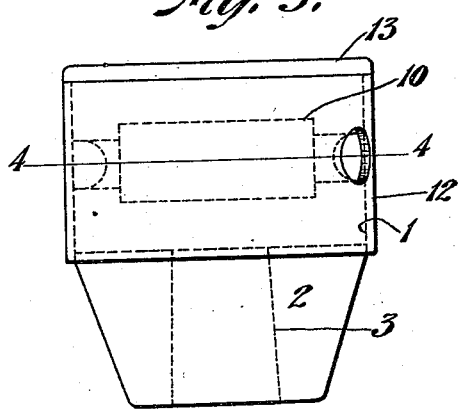
Figure 4:
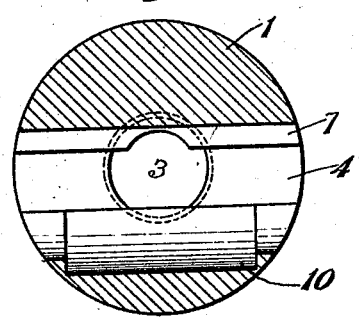
Figure 5:
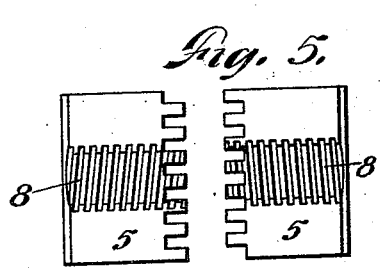
Figure 7:
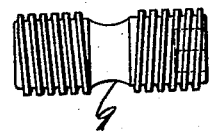
Figures 8, 9:
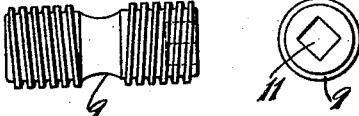
Figure 6:

In the accompanying drawings Fig. 1 shows a transverse section of the chuck on the plane indicated by the line 1—1 on Fig. 2. Fig. 2 shows a side view of the chuck. Fig. 3 shows a side view of the chuck turned 90 degrees. Fig. 4 shows a transverse section of the body of the chuck on the plane indicated by the line 4—4 on Fig. 3. Fig. 5 shows the bottom view of the jaws. Fig. 6 shows a front view of the jaws. Fig. 7 shows a side view of one jaw. Fig. 8 is a side view of the feed screw. Fig. 9 is an end view of the feed screw.

This chuck has a cylindrical body 1 with a conical end 2 containing a tapering opening 3 for receiving the shank of the spindle to which it is to be applied for use. Milled diametrically across the body is an opening 4 for containing the jaws 5. In the upper faces of the jaws are mortises 6 for receiving the tongues 7 formed on the upper wall of the opening in the body for guiding the jaws back and forth, and in the lower faces of the jaws are female screw threads 8, one jaw having a right hand thread and the other a left hand thread. The holding faces of the jaws are toothed so that they will close together sufficiently to hold drills or other tools or stock of small diameter as well as large, and the edges of the teeth are angularly recessed so that they will fit tools or stock of various diameters.

Engaging with the threads of the jaws are the right and left threads of the feed screw 9 which is made of a single piece of metal and grooved at the middle so as to not interfere with whatever is inserted between the jaws. The feed screw is dropped into a pocket 10 milled transversely of the cylindrical body below the jaw opening and is held from longitudinal movement by the engagement of its ends with the end walls of the pocket in which it is located. In one end of the screw is an angular socket 11 for receiveing the end of an operating key. Rotating the screw one way closes the jaws and rotating it the other way opens the jaws.

After the jaws and screw have been assembled a sleeve 12 is fitted tightly upon the outside of the cylindrical body and a face plate 13 is fastened to the end of the body. There being an opening through the sleeve opposite the end of the screw to permit the insertion of the operating key and an opening through the face plate for the drill or other piece to be held by the jaws.

This construction while very cheap to manufacture and easy to assemble is rugged and has long life for all of the end thrusts of the screw are sustained by the walls of the body at the ends of the screw, a feature which is valuable where the chuck is opened and closed frequently and must be closed tightly on whatever is to be held. Furthermore, the sleeve not only reenforces and strengthens the body particularly opposite the ends of the screw and closes in the jaws, but provides a smooth exterior surface without projection and aids in excluding dust and chips and also in retaining lubricant.

The invention claimed is:

A chuck having a cylindrical body with a diametrical jaw opening and a screw pocket communicating with one side of the jaw opening and terminating within the body, said body having two tongues extending across the wall of the jaw opening opposite the screw pocket, two toothed jaws movable diametrical of the body in the jaw opening, said jaws having respectively right and left female threads in the middle of one of their side faces and grooves near the edges of the opposite side faces, said grooves receiving the tongues of the body, a feed screw with right and left threads engaging the threads in the sides of the jaws, said screw having an angular socket in one end and lying in the screw pocket in the body and held from longitudinal movement by the end wall of said screw pocket, a sleeve tightly fitting the cylindrical body, said sleeve closing the ends of the jaw opening and reenforcing the body about the ends of the screw pocket, and a plate detachably secured to the end of the body and closing the jaw opening on one side, whereby the jaws at all times and in all positions are entirely encased and firmly supported by the body.

LOUIS E. STONER.